July 5, 1960 H. F. MATARÉ 2,944,167

SEMICONDUCTOR OSCILLATOR

Filed Oct. 21, 1957

INVENTOR
HERBERT F. MATARÉ
BY Theodore Jay Jr.
ATTORNEY

United States Patent Office 2,944,167

Patented July 5, 1960

2,944,167

SEMICONDUCTOR OSCILLATOR

Herbert F. Mataré, West End, N.J., assignor, by mesne assignments, to Sylvania Electric Products Inc., Wilmington, Del., a corporation of Delaware Filed Oct. 21, 1957, Ser. No. 691,213

8 Claims. (Cl. 307—88.5)

Figure 1:
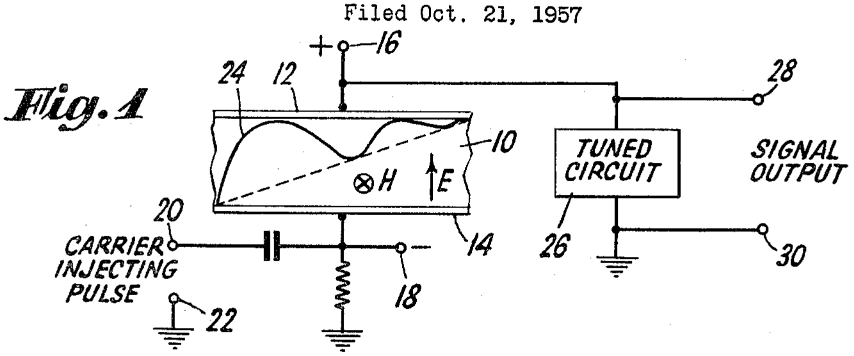

My invention is directed toward solid state devices for generating electromagnetic radiation of short wavelengths.

As is well known in the prior art, short wavelength electromagnetic radiation can be produced in a vacuum tube (such as a magnetron) wherein the path of freely moving electrons, accelerated in a time-invariant electric field, is modified by the influence of a time-invariant magnetic field having its magnetic field vector pointing in a direction perpendicular both to the electric field vector and to the instantaneous direction of electron motion. Electrical energy is transferred from the electron to the electric field during intervals in which the electrons have a component of motion in a direction opposite to that defined by the electric field vector; hence, during these intervals, short wavelength radiation is produced. This technique has been quite successful for generating radiation of wavelengths ranging downward to the order of centimeters.

Recent advances in the electronic arts, however, have developed an urgent need for devices which can generate, at appreciable power levels, extremely short wavelength radiation, as for example wavelengths on the order of a millimeter or a fraction of a millimeter; insofar as I am aware, magnetrons and other similar types of vacuum tubes cannot function in this manner.

In contradistinction, I have invented a solid state device for generating extremely short wavelength radiation at appreciable power levels.

Accordingly it is an object of the present invention to provide a new and improved solid state device of the character indicated.

Another object is to generate, at appreciable power levels, electromagnetic radiation of extremely short wavelength, as for example wavelengths on the order of a millimeter or a fraction of a millimeter.

Still another object is to subject a semiconductor body to the influence of mutually orthogonal, time-invariant, electric and magentic fields in such manner as to generate electromagnetic radiation having extremely short wavelengths.

Yet another object is to provide a new and improved solid state device which utilizes the interaction of charge-carriers with mutually orthogonal, time-invariant, electric and magnetic fields to produce electromagnetic radiation having extremely short wavelengths.

These and other objects of my invention will either be explained or will become apparent hereinafter.

Under certain specified conditions, the movement of charge-carriers (such as electrons and holes) in a crystalline semiconductor under the influence of electric and magnetic fields can be regarded as analogous to the movement of charge-carriers (such as electrons and positrons) in a vacuum under the influence of electric and magnetic fields. More particularly, for this analogy to hold, the lattice structure of the crystalline semiconductor must exhibit a high degree of regularity or periodicity; i.e. lattice irregularities, impurities and the like must be minimized. In addition, the masses of charge-carriers cannot be regarded as equivalent in both situations, since a charge-carrier when moving in a semiconductor possesses an apparent mass (known to the art as "effective mass") differing from the mass (known to the art as "free mass") of a corresponding charge-carrier when moving in a vacuum.

In accordance with the principles of my invention, a crystalline semiconductor body exhibiting a high degree of periodicity and containing a small amount of acceptor (P) and/or donor (N) type impurities is cooled to a low temperature. Mutually orthogonal, time-invariant, electric and magnetic fields are established within the body. A resonant circuit tuned to a predetermined frequency (the cyclotron frequency) is coupled to the body. (As will become apparent hereafter, the cyclotron frequency is determined by the intensity of the magentic field.) When charge-carriers are made available within the body, these carriers will be accelerated in spiral orbits in a plane perpendicular to the magnetic field vector. Due to this acceleration, energy will be transferred periodically from the carriers to the circuit at the cyclotron frequency, thus inducing an alternating electric field of cyclotron frequency in the resonant circuit. As a consequence the alternating field vector and the time-invariant electric field vector will point in the same direction during one half cycle of the alternating field and will point in opposite directions during the next half cycle.

More particularly, the resonant frequency will be approximately equal to the quantity $$\frac{qH}{m^*c}$$

where $q$ is the electric charge of any one carrier, H is the magnetic field intensity, $m^*$ is the effective mass of the carrier, and $c$ is the velocity of an electromagnetic wave in vacuum.

The charge-carriers can be either electrons or holes and can be either majority or minority carriers, as long as the carrier relaxation time (i.e. the average time required for a charge-carrier to charge its energy state during a coherent transition process without being scattered) is of sufficient duration to satisfy the expression $(\omega_0)\tau \geq 1$. Stated differently, the frequency $\omega_0$ of the generated voltage must be equal to or larger than the reciprocal of the average relaxation time $\tau$ of the charge-carriers employed.

Illustrative embodiments of my invention will now be described in detail with reference to the accompanying drawings, wherein—

Figure 2:
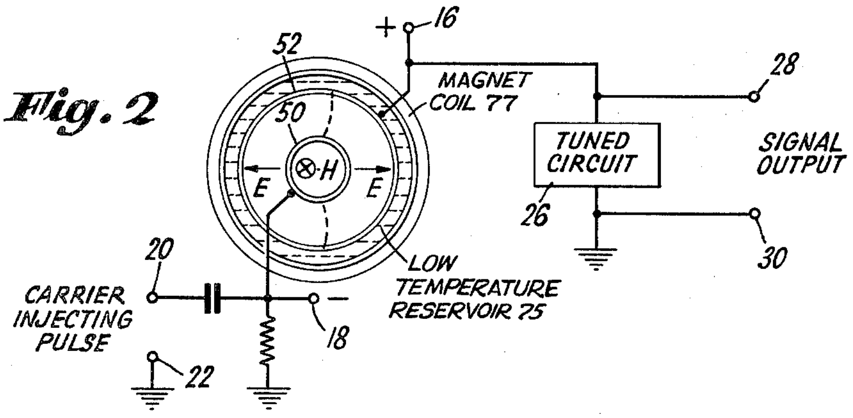
Figure 3:
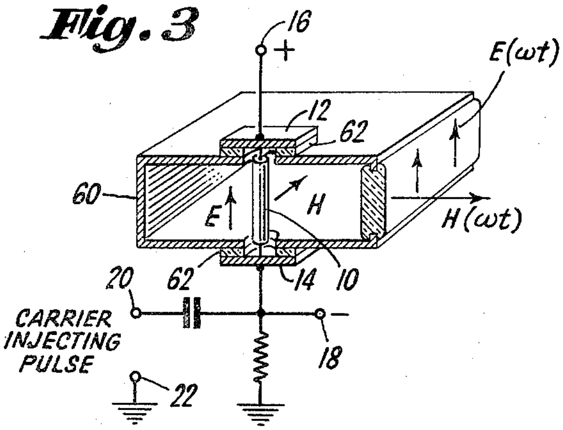
Figure 4:
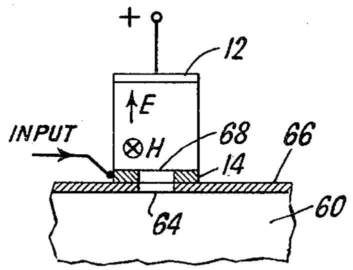

Figs. 1 and 2 illustrate in simplified form apparatus illustrating the invention; and Figs. 3 and 4 illustrate in more detailed form the apparatus of Fig. 1.

Fig. 1 illustrates the path of charge-carriers in a crystalline semiconductor body 10 under the conditions indicated above; i.e. the body contains a small amount of donor or acceptor impurities, has a high degree of periodicity and is cooled to a low temperature as, for example, by immersion in a low temperature reservoir. For ease in illustration this reservoir is only shown in Fig. 2 as reservoir 75. (It will be understood, however, that this reservoir is to be used also with the devices of Figs. 1, 3 and 4.)

Upper and lower electrically conductive plates 12 and 14 are secured to opposite exposed surfaces of body 10. A time-invariant electric field is applied between terminals 16 and 18 which are respectively connected to plates 12 and 14. Hence, the electric field vector E lies in the plane of the paper and is perpendicular to the plates 12 and 14, this vector pointing toward the positive (upper) plate. A magnetic field is established within body 10 in a direction perpendicular to the electric field, the magnetic field vector H being perpendicular to the plane of the paper and pointing inward therefrom. (As shown in Fig. 2, this magnetic field can be produced by means of a magnetic coil 77.)

When charge-carriers, for example electrons, are produced in body 10 and appear substantially at rest at point A, as for example by applying a direct voltage or periodically spaced pulses of the polarity indicated between terminals 20 and 22, the electric field exerts an electric force on the electrons in such a direction that the electrons travel toward the positively charged plate 12. As the electrons move, the magnetic field exerts a magnetic force on the electron which is perpendicular both to the magnetic field vector and to the instantaneous direction of electron motion. Due to the combined influence of both forces, the electrons travel upward and toward the right side of Fig. 1 in a cycloidal path 24. The frequency of cycloidal motion (known as the cyclotron frequency) is defined by the approximate formula $$\omega_0=\frac{eH}{m^*c}$$

as previously indicated, $e$ being the unit charge.

Since the magnetic force is always exerted at right angles to the instantaneous direction of electron motion, no energy can be transferred between the magnetic field and the electron.

During each first half sector of travel along any arc of path 24, the electrons travel toward the positively charged plate. Due to the forces of attraction between the negatively charged electrons and the positively charged plate, the electrons are accelerated. Under these conditions, the energy of the electrons is increased, the increase in energy being contributed by the time invariant electric field. Hence, during each half sector of travel energy is transferred from the time-invariant electric field to the electrons. During the second half sector of travel along any arc of path 24, the electrons travel toward the negatively charged plate. Due to the forces of repulsion between the negatively charged electrons and the negatively charged plate, the electrons are decelerated. Under these conditions, the energy of the electrons is decreased. As a consequence energy is transferred from the electron to the electric field. Provided that a resonant circuit 26 tuned to $\omega_0$ is coupled to the body, as for example, being coupled between plate 12 and ground, this change in energy induces an alternating electric field of frequency $\omega_0$ across circuit 26 and the alternating field in turn produces an alternating voltage of frequency $\omega_0$ which appears across terminals 28 and 35. (The alternating field vector and the time-invariant electric field vector point in the same direction during one half cycle of the alternating field and point in opposite directions during the next half cycle.) The lifetime $\tau$ which, as previously indicated, must satisfy the expression $\omega_0\tau \geqq 1$, has such a value that an appreciable number of electrons will not recombine with the oppositely charged carriers (holes) until they have completed a part of or a full cycle or recombine at the positive plates. (Note that if the polarity of the pulses applied between terminals 20 and 22 is reversed and the polarity of terminals 20 and 22 are also reversed, the charge-carriers will be holes, not electrons, but the same action will ensue.)

When the semiconductor body is formed, for example, of germanium or silicon having a donor impurity density on the order of $10^{14}$ atoms per cubic centimeter and is maintained at a sufficiently low temperature, as for example being immersed in a Dewar flask containing liquid helium (4° Kelvin) (not shown), the relaxation time will be approximately $10^{-10}$ to $10^{-11}$ seconds. Under these conditions, the resonant frequency $\omega_0$ will be about $(2\pi)$ $(24 \times 10^{-9})$ radians per second corresponding to a frequency of about 24K mc./s. or a wavelength of 1.25 cm.

The electric field gradient required for the above is about 100 volts per centimeter and the magnetic field is about 800–1100 gauss.

Higher temperatures ranging upward to the temperature of liquid nitrogen (77° Kelvin) can be used providing a different semiconductor material, as for example, indium antimonide, is substituted for germanium or silicon.

Alternatively, as shown in Fig. 2, the geometry can be cylindrical; i.e. body 10 is a hollow cylinder having its inner and outer surfaces coated with metal films 50 and 52 which function as plates 12 and 14 of Fig. 1. In Fig. 2, however, the electric field vector E points radially outward from the inner film 50, and the magnetic field vector H points axially upward through body 10. Under these conditions, the electrons spiral about an axis defined by the magnetic field vector again at a cyclotron frequency of $\omega_0$.

Referring now to Fig. 3, the resonant circuit shown in block form in Figs. 1 and 2 is replaced by a tuned cavity 60. To prevent short circuits, the walls of the cavity are separated from plates 12 and 14 by mica spacers 62. The alternating electromagnetic field of frequency $\omega_0$ is produced within the cavity, having the electric field $E(wt)$ and magnetic field $H(wt)$ vectors instantaneously oriented as shown during a selected half cycle of the alternating field, these vectors pointing in opposite directions during the next half cycle of the alternaing field.

Fig. 4 shows a modification of Fig. 3 wherein the body 10 is placed outside of the cavity 60. It will be understood that the input terminals 22 and 62 and the associated resistance-capacitance network is also utilized with the device of Fig. 4 although not shown therein. In this case, a small opening 68 in a wall 66 of cavity 60 permits the electromagnetic field within the cavity to contact a portion 68 of a bottom surface of body 10. The remaining portion of surface 70 is metalized and in contact with wall 66 of cavity 60. The alternating magnetic field of frequency $\omega_0$ is established within the cavity in the same manner as in Fig. 3.

While I have shown and pointed out my invention as applied above, it will be apparent to those skilled in the art that many modifications can be made within the scope and sphere of my invention as defined in the claims which follow.

What is claimed is:

1. In combination, a crystalline semiconductor body exhibiting a high degree of periodicity and containing a small amount of impurities selected from the class consisting of donor and acceptor impurities; means to cool said body to a low temperature not exceeding the temperature of liquid nitrogen; means to establish mutually orthogonal, time-invariant magnetic and electric fields within said body; means to produce charge-carriers having a predetermined carrier relaxation time $\tau$ within said body; resonant means tuned to a predetermined frequency $\omega_0$ and coupled to said body, said frequency being at least equal to the reciprocal of said relaxation time and being proportional to the intensity of said invariant magnetic field whereby said carriers are accelerated in spiral orbits in a plane perpendicular to the direction of the magnetic field and induce an alternating electromagnetic field of said frequency in said resonant means, the electric vector of the said induced field during one half cycle of said alternating field pointing in the same direction as the electric vector of said time-invariant field and during the next half cycle pointing in opposite direction.

2. In combination, a pair of separated, parallel, electrically conductive elements, a crystalline semi-conductor body exhibiting a high degree of periodicity and containing a small amount of impurities selected from the class consisting of donor and acceptor impurities, said body being electrically connected between said elements; means to cool said body to a low temperature not exceeding the temperature of liquid nitrogen; means coupled to said elements to establish an electric time-invariant field within said body, the electric field vector pointing in a direction perpendicular to both plates; means to establish a time-invariant magnetic field in said body, the magnetic field vector pointing in a direction perpendicular to the electric field vector; means to produce charge-carriers having a determined relaxation time $\tau$ within said body; resonant means, tuned to a predetermined frequency $\omega_0$, and coupled between said elements, said frequency being at least equal to the reciprocal of said relaxation time and being proportional to the intensity of said invariant magnetic field whereby said carriers are accelerated along a cycloidal path in a plane perpendicular to the magnetic field vector and parallel to the electric field vector and induce an alternating electromagnetic field of said frequency in said resonant means, the alternating field vector being parallel to the vector of said invariant electric field.

3. In combination, a hollow, cylindrically shaped crystalline semiconductor body exhibiting a high degree of periodicity and containing a small amount of impurities selected from the class consisting of donor and acceptor impurities, each of the inner and outer curved surfaces of said body being coated with an electrically conductive film; means to cool said body to a low temperature not exceeding the temperature of liquid nitrogen; means to establish a time-invariant magnetic field within said body, the magnetic field vector pointing in a direction parallel to the axis of said body; means coupled between said outer and inner films to establish a time-invariant electric field within said body, the electric field vector pointing in radial directions always perpendicular to the magnetic field vector; means to produce charge-carriers having an average relaxation time $\tau$ within said body; resonant means tuned to a predetermined frequency $\omega_0$ and coupled between said films, said frequency being at least equal to the reciprocal of said relaxation time and being proportional to the intensity of said invariant magnetic field whereby said carriers are accelerated in spiral orbits about the axis of said body and induce an alternating electromagnetic field of said frequency in said resonant means, the alternating field vector being parallel to the field vector of said time-invariant electric field.

4. In combination, a crystalline semiconductor body exhibiting a high degree of periodicity and containing a small amount of impurities selected from the class consisting of donor and acceptor impurities; means to cool said body to a low temperature not exceeding the temperature of liquid nitrogen; means to establish mutually orthogonal, time-invariant magnetic and electric fields within said body; means to produce charge-carriers having a predetermined relaxation time $\tau$ within said body; a resonant cavity tuned to a predetermined frequency $\omega_0$, said cavity being positioned adjacent and coupled to said body, said frequency being at least equal to the reciprocal of said relaxation time and being proportional to the intensity of said invariant magnetic field whereby said carriers are accelerated in spiral orbits in a plane perpendicular to the direction of the magnetic field and induce an alternating electromagnetic field of said frequency in said cavity, the electric field vector of said induced field pointing parallel to the electric field vector of said time-invariant field.

5. The combination as set forth in claim 4 wherein said body is mounted inside said cavity.

6. The combination as set forth in claim 4 wherein said body is mounted adjacent an outside wall of said cavity.

7. In combination, a pair of separated, parallel, electrically conductive plates, a crystalline semiconductor body exhibiting a high degree of periodicity and containing a small amount of impurities selected from the class consisting of donor and acceptor impurities, said body being interposed between said plates and in contact therewith; means to cool said body to a low temperature not exceeding the temperature of liquid nitrogen; means coupled between said plates to establish a time-invariant electric field within said body, the electric field vector pointing in a direction perpendicular to both plates; means to establish a time-invariant magnetic field in said body, the magnetic field vector pointing in a direction perpendicular to the electric field vector; means to produce charge-carriers having a predetermined relaxation time $\tau$ within said body; a resonant cavity interposed between said plates and electrically insulated therefrom; said body being mounted in said cavity, said cavity being tuned to a frequency $\omega_0$ and being coupled to said body, said frequency being at least equal to the reciprocal of said relaxation time and being proportional to the intensity of said invariant magnetic field whereby said carriers are accelerated along a cycloidal path in a plane perpendicular to the magnetic field vector and the electric field vector and inducing an alternating electromagnetic field of said frequency in said cavity, the alternating field vector and the vector of said invariant electric field pointing in parallel directions.

8. In combination, a rectangular shaped crystalline semiconductor body exhibiting a high degree of periodicity and containing a small amount of impurities selected from the class consisting of donor and acceptor impurities, two opposite surfaces of said body being coated with an electrically conductive film; means to cool said body to a low temperature not exceeding the temperature of liquid nitrogen; means to establish a time-invariant magnetic field within said body; the magnetic field vector pointing in a direction parallel to the axis of said body; means coupled between said films to establish a time-invariant electric field within said body, the electric field vector pointing in a direction perpendicular to the magnetic field vector and perpendicular to said surfaces; means to produce charge-carriers having a predetermined relaxation time $\tau$ within said body; a resonant cavity tuned to a predetermined frequency $\omega_0$ and coupled to said body, said cavity being externally adjacent one of said surfaces, said frequency being at least equal to the reciprocal of said relaxation time and being proportional to the intensity of said invariant magnetic field whereby said carriers are accelerated in spiral orbits about the axis of said body and induce an alternating electromagnetic field of said frequency in said cavity, the alternating field vector and the invariant electric field vector pointing in parallel directions.

References Cited in the file of this patent

UNITED STATES PATENTS

| | | |
|---|---|---|
| 2,553,490 | Wallace | May 15, 1951 |
| 2,460,109 | Southworth | Jan. 25, 1949 |
| 2,725,474 | Ericsson | Nov. 29, 1955 |
| 2,736,822 | Dunlap | Feb. 28, 1956 |
| 2,774,890 | Semmelman | Dec. 18, 1956 |

OTHER REFERENCES

Article in French publication Annales De Radioelectricite, vol. 9, No. 38, pp. 360–365, October 1954. (Copy in Scientific Library TK 6540A6.)